United States Patent
Toplak

(10) Patent No.: US 11,520,921 B2
(45) Date of Patent: Dec. 6, 2022

(54) METHOD FOR GENERATING METADATA-FREE TREES

(71) Applicant: MyPrivacy GmbH, Vienna (AT)

(72) Inventor: Erwin Toplak, Trumau (AT)

(73) Assignee: MyPrivacy GmbH, Vienna (AT)

( * ) Notice: Subject to any disclaimer, the term of this patent is extended or adjusted under 35 U.S.C. 154(b) by 223 days.

(21) Appl. No.: 16/965,350

(22) PCT Filed: Jan. 31, 2018

(86) PCT No.: PCT/EP2018/052450
§ 371 (c)(1),
(2) Date: Jan. 22, 2021

(87) PCT Pub. No.: WO2019/149360
PCT Pub. Date: Aug. 8, 2019

(65) Prior Publication Data
US 2021/0141921 A1  May 13, 2021

(51) Int. Cl.
*G06F 21/62* (2013.01)
*G06F 16/901* (2019.01)
(Continued)

(52) U.S. Cl.
CPC ...... *G06F 21/6227* (2013.01); *G06F 16/9027* (2019.01); *G06F 21/31* (2013.01);
(Continued)

(58) Field of Classification Search
CPC .. G06F 21/6227; G06F 16/9027; G06F 21/31; G06F 21/602; G06F 21/62; H04L 63/0428; H04L 9/3242
See application file for complete search history.

(56) References Cited

U.S. PATENT DOCUMENTS 7,668,316 B2 * 2/2010 Choi ............... H04N 21/25891
380/255
10,540,064 B1 * 1/2020 Chasin ............... G06F 16/9027
(Continued)

FOREIGN PATENT DOCUMENTS

DE  20 2015 005361 U1  10/2015
DE  202015005361 U1 * 11/2015 ........... H04L 9/0877

OTHER PUBLICATIONS

International Search Report for PCT Application Serial No. PCT/EP2018/052450, dated Jul. 19, 2018, 7 pages (including English Translation).
(Continued)

*Primary Examiner* — Cheng-Feng Huang
(74) *Attorney, Agent, or Firm* — Fisherbroyles, LLP

(57) ABSTRACT

A method for storing hierarchical data protected by access data in an untrustworthy environment, wherein unique identification values of child nodes of at least one associated tree are determined for the data and are stored together with the data. The root node entry point is calculated based on the access data by means of a predeterminable calculation function in a volatile way, and the root node entry point represents a secret node entry point from which the identification value of a root node of the tree is subsequently calculated. The root node represents one of the child nodes in this tree, as a child node generation step is applied to generate the identification values of the child nodes based on one of the secret node entry points. A child node numbering set contains at least as many different elements as the number of child nodes to be generated is created or used.

10 Claims, 5 Drawing Sheets

Exemplary tree

(51) Int. Cl.
  *G06F 21/31*   (2013.01)
  *G06F 21/60*   (2013.01)
  *H04L 9/32*    (2006.01)
  *H04L 9/40*    (2022.01)

(52) U.S. Cl.
  CPC ............ *G06F 21/602* (2013.01); *G06F 21/62* (2013.01); *H04L 9/3242* (2013.01); *H04L 63/0428* (2013.01)

(56) References Cited

U.S. PATENT DOCUMENTS

| | | | | |
|---|---|---|---|---|
| 10,810,258 | B1* | 10/2020 | Niewiadomski | .... G06F 16/9027 |
| 10,860,738 | B2* | 12/2020 | Czerkowicz | .......... G06F 16/137 |
| 2004/0165724 | A1 | 8/2004 | Choi et al. | |
| 2012/0110336 | A1* | 5/2012 | Frey | ...................... G06F 21/565 |
| | | | | 713/181 |
| 2013/0144840 | A1* | 6/2013 | Anglin | ................ G06F 11/1469 |
| | | | | 707/640 |
| 2013/0325903 | A1* | 12/2013 | Rohlf | ................... G06F 16/9027 |
| | | | | 707/E17.044 |
| 2014/0310317 | A1* | 10/2014 | Spillane | .............. G06F 16/9027 |
| | | | | 707/803 |
| 2016/0156464 | A1* | 6/2016 | Näslund | ................ H04L 9/0822 |
| | | | | 713/171 |
| 2017/0250798 | A1* | 8/2017 | Enga | ...................... G06F 21/602 |
| 2017/0300713 | A1* | 10/2017 | Fan | ...................... H04L 63/0435 |
| 2019/0238394 | A1* | 8/2019 | Watkins | .............. G06F 16/9027 |

OTHER PUBLICATIONS

Sandhu et al., "Cryptographic implementation of a tree hierarchy for access control", Information Processing Letters, vol. 27 No. 2, Feb. 29, 1988, pp. 95-98.

Written Opinion for PCT Application Serial No. PCT/EP2018/052450, 8 pages.

International Preliminary Report received for PCT Application Serial No. PCT/EP2018/052450 dated Aug. 13, 2020, 10 pages.

* cited by examiner

Known storage variants for tree representations
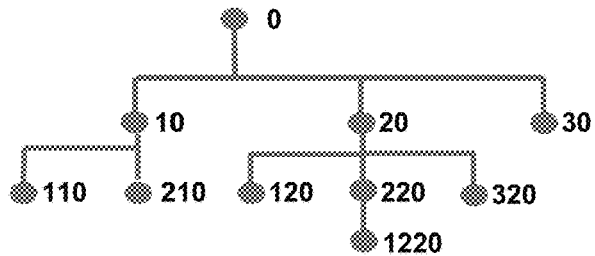
Figure 1: Exemplary tree
Variant 1: Adjacency List Model
| Child Node | Parent | Assigned Data |
|---|---|---|
| 0 | -1 | ................ |
| 10 | 0 | ................ |
| 20 | 0 | ................ |
| 30 | 0 | ................ |
| 110 | 10 | ................ |
| 210 | 10 | ................ |
| 120 | 20 | ................ |
| 220 | 20 | ................ |
| 320 | 20 | ................ |
| 1220 | 220 | ................ |
Figure 2: Variant 1
Variant 2: Array of Pointers Model
| Child Node | Child List | Assigned Data |
|---|---|---|
| 0 | <10; 20; 30> | ................ |
| 10 | <110; 220> | ................ |
| 20 | <120; 220; 320> | ................ |
| 30 |  | ................ |
| 110 |  | ................ |
| 210 |  | ................ |
| 120 |  | ................ |
| 220 | 1220 | ................ |
| 320 |  | ................ |
| 1220 |  | ................ |
Figure 3: Variant 2

Variant 3: Nested Intervall Model
| Child Node | Child Range | Assigned Data |
|---|---|---|
| 0 | >0  <1 | .................... |
| 0 , 1 | >0,1  <0,2 | .................... |
| 0 , 2 | >0,2  <0,3 | .................... |
| 0 , 3 | >0,3  <0,4 | .................... |
| 0 , 11 | >0,11  <0,12 | .................... |
| 0 , 12 | >0,12  <0,13 | .................... |
| 0 , 21 | >0,21  <0,22 | .................... |
| 0 , 22 | >0,22  <0,23 | .................... |
| 0 , 23 | >0,23  <0,24 | .................... |
| 0 , 221 | >0,221  <0,222 | .................... |
Figure 4: Variant 3
Variant 4: Nested Set Model (incl. model flow overview)
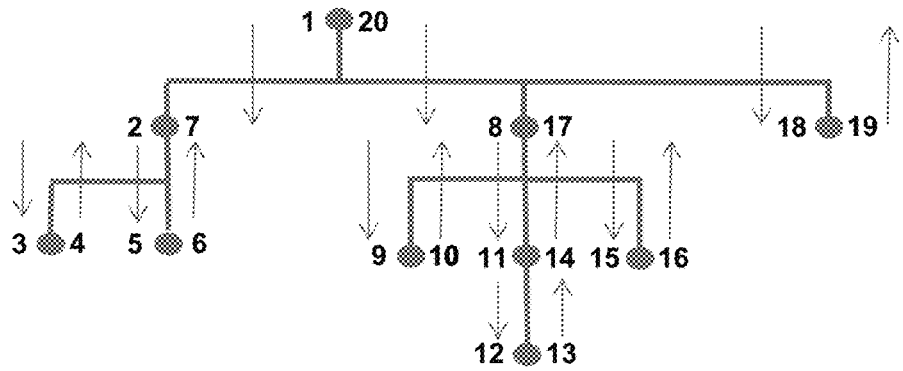
| Left | Right | Assigned Data |
|---|---|---|
| 1 | 20 | .................... |
| 2 | 7 | .................... |
| 3 | 4 | .................... |
| 5 | 6 | .................... |
| 8 | 17 | .................... |
| 9 | 10 | .................... |
| 11 | 14 | .................... |
| 12 | 13 | .................... |
| 15 | 16 | .................... |
| 18 | 19 | .................... |
Figure 5: Variant 4

Variant 5: Hierarchical Encoding Scheme Model

| Child Node | Assigned Data |
|---|---|
| 1000 | ………………… |
| 1100 | ………………… |
| 1200 | ………………… |
| 1300 | ………………… |
| 1110 | ………………… |
| 1120 | ………………… |
| 1210 | ………………… |
| 1220 | ………………… |
| 1230 | ………………… |
| 1221 | ………………… |

Figure 6: Variant 5

Variant 6: Node Path Enumeration Model

| Child Node | Node Path | Assigned Data |
|---|---|---|
| 0 | <0> | ………………… |
| 10 | <0 -> 10> | ………………… |
| 20 | <0 -> 20> | ………………… |
| 30 | <0 -> 30> | ………………… |
| 110 | <0 -> 10 -> 110> | ………………… |
| 210 | <0 -> 10 -> 210> | ………………… |
| 120 | <0 -> 20 -> 120> | ………………… |
| 220 | <0 -> 20 -> 220> | ………………… |
| 320 | <0 -> 20 -> 320> | ………………… |
| 1220 | <0 -> 20 -> 220 -> 1220> | ………………… |

Figure 7: Variant 6

Variant 7: Edge Path Enumeration Model

| Edge Path | Assigned Data |
|---|---|
|  |  |
| 0 | ………………… |
| 0.1 | ………………… |
| 0.2 | ………………… |
| 0.3 | ………………… |
| 0.1.1 | ………………… |
| 0.1.2 | ………………… |
| 0.2.1 | ………………… |
| 0.2.2 | ………………… |
| 0.2.3 | ………………… |
| 0.2.2.1 | ………………… |

Figure 8: Variant 7

Variant 8: Leftmost Child Right Sibling Model

| Child Node | Firts Child | Sibling | Assigned Data |
|---|---|---|---|
|  |  |  |  |
| 0 | 10 | -1 | ………………… |
| 10 | 110 | 20 | ………………… |
| 20 | 120 | 30 | ………………… |
| 30 | -1 | -1 | ………………… |
| 110 | -1 | 120 | ………………… |
| 210 | .1 | -1 | ………………… |
| 120 | -1 | 220 | ………………… |
| 220 | 1220 | 320 | ………………… |
| 320 | -1 | -1 | ………………… |
| 1220 | -1 | -1 | ………………… |

Figure 9: Variant 8

Variant 9: Sorted Unlimited Depth Tree Model

| Child Node | depth | Assigned Data |
|---|---|---|
| 0 | 0 | ................... |
| 10 | 1 | ................... |
| 110 | 2 | ................... |
| 210 | 2 | ................... |
| 20 | 2 | ................... |
| 120 | 2 | ................... |
| 220 | 2 | ................... |
| 1220 | 3 | ................... |
| 320 | 2 | ................... |
| 30 | 1 | ................... |

Grey: not stored

Figure 10: Variant 9

METHOD FOR GENERATING METADATA-FREE TREES

CROSS-REFERENCE TO RELATED APPLICATION

This application is a National Stage Application of international Application No. PCT/EP2018/052450, filed Jan. 31, 2818, which is incorporated by reference herein in its entirety.

SUMMARY

The invention relates to a method for generating metadata-free trees protected by secret node entry points, encrypted data being preferably assigned to the child nodes of said trees, said child nodes and the data assigned to them being stored on a non-volatile storage device in an untrustworthy environment, so that a user may recursively recognize and reconstruct only those edges and nodes of trees and their data whose secret node entry points are known to him as sufficiently long binary sequences.

Access data may, for example, be a user and his/her associated password or a token delivered by another person or similar variants from which a high-entropy binary sequence may be generated.

Hierarchical data is defined as a set of data elements that are connected by hierarchical relationships. Hierarchical relationships exist when a data element is superordinate to another element. Examples of the hierarchical data generally stored in databases include:

An organizational structure
A file system
A group of tasks in a project
A taxonomy of linguistic terms
A diagram of links between web pages
Patients and their course of disease In computer science, a tree is an abstract data type or a data structure that implements this abstract data type and an object that can be used to map hierarchical structures. The objects specified by the hierarchy are called nodes. Typically, each node stores a list of references to its subordinate nodes, starting from a first node, the root. These references are called edges. Subordinate nodes of a node are also called its child nodes, and the node referring to a node is called the parent node.

Trees are one of the most used data structures in computer science. They represent a certain subset of all graphs, namely those in which there is exactly one node more than edges.

A tree as data structure has data assigned to its nodes; said data can be structured or unstructured. The present invention refers to such trees.

In practice, trees to be stored permanently and their associated data are often stored in tables of a relational database; there are several variants, each of which is designed for different applications.

These variants are shown in FIGS. 2 to 10 and all refer to the tree in FIG. 1. For each variant there are specializations and also combinations with other variants, but this does not change anything about the structures' basic nature. All storage options that are known according to the state of the art can be assigned to one of these representation variants.

Often several trees are stored in a table of this kind; in such a case, the actual root node may, for example, have an additional root node which identifies a specific tree (for example of a user) as such superordinate to it. Alternatively—often for performance reasons—an additional column in which a value for the tree is stored for each node can be inserted. In practice, there are many different options which are used sensibly depending on the respective application.

What all these trees have in common is that they can be completely reconstructed starting from their roots. This inevitably results in the generation of metadata (their specific structure, the number of their nodes, the depths of these nodes, etc.) about trees, even if the information associated with them is encrypted.

The scope of application of the trees of the invention is in cryptography, i.e. the encryption of data, guaranteeing data authenticity and integrity—and the best possible avoidance of the generation of metadata.

In the present document, an untrustworthy environment is taken to be a cloud storage space, for example, which at least the server operator, but sometimes also hackers, can analyze at any time. Read protection can therefore only be guaranteed by ensuring that only persons specified by the owner have secret node entry points for data entry, from which they may recognize and reconstruct the tree and decrypt its data.

As mentioned in the specification, the state of the art does not yet allow for metadata-free storage of trees, especially if a large number of trees are stored in a table.

BRIEF DESCRIPTION OF THE DRAWINGS

FIG. 1 shows a tree, different variants of which can be stored in a database (or a key value store).

In FIGS. 2 to 10 the tree from FIG. 1 is shown in a table with the known storage variants.

DETAILED DESCRIPTION

The aim of the invention is therefore to show a method by means of which directed trees starting from a root (outbound directed trees), to which data can be assigned, can be recursively created in a way that there is a secret node entry point for each node of the tree, from which the hierarchically subordinate part of the tree can be recursively reconstructed, without gaining any information about the existence of any siblings or parents. (Metadata-free).

A method is shown in which a public tree-spanning set of child nodes, consisting of pseudo-random child nodes with associated, preferably encrypted, data from different metadata-free trees, exists on the non-volatile storage device in a way that no mathematical or other relationships can be established between the individual elements.

In general, one of the positive characteristics of trees is that root nodes are treated in the same way as child nodes, which results in a recursive applicability of functions to any node, regardless of its position in the tree.

In the present document, all child nodes, including the root node, are calculated from secret node entry points which are not directly part of the tree, but without which no part of the tree can be determined. Rather, only that part of a tree can be reconstructed for which a secret node entry point is known. It cannot be determined whether there are siblings or parent nodes for a secret node access point. No information can be derived from a child node itself in the method of the invention, which makes it possible to store it together with preferably encrypted data in an untrustworthy environment. The secret node entry points are always recalculated at runtime, so there is no advantage in storing them permanently. In case of permanent storage, there is a risk of data theft or destruction of the entire tree.

In a method for storing hierarchical data protected by access data in an untrustworthy environment, wherein unique identification values of child nodes of at least one associated tree are determined for the data and stored together with the data, this is achieved in accordance with the invention by calculating a root node entry point based on the access data by means of a predeterminable calculation function in a volatile way, said root node entry point representing a secret node entry point from which the identification value of a root node of the tree is subsequently calculated, said root node representing one of the child nodes in this tree, as a child node generation step is applied to generate the identification values of the child nodes based on one of the secret node entry points, in said step at least:

a child node numbering set, which contains at least as many different elements as the number of child nodes to be generated and which can be reconstructed for the volatile secret node entry point, is created or used, for the first and each further required child node, a cryptographic hash function is applied to at least the volatile secret node entry point and an assignable value from the child node numbering set, and the result of the applied cryptographic hash function represents the respective identification value of the child node, the identification values of the child nodes calculated in this way, together with their associated, preferably encrypted, data, are added to a tree-spanning set of child nodes on a non-volatile storage device in an untrustworthy environment, and the child nodes of the tree can be expanded recursively by hierarchically subordinate child nodes, by calculating secret node entry points for each of these child nodes in a node entry point generation step in a volatile manner by at least applying a cryptographic hash function to at least that secret node entry point from which the child node to be expanded by hierarchically subordinate child nodes was calculated, and to the identification value of the very same child node, and, subsequently, the child node generation step is recursively applied to these newly generated volatile secret node entry points, said secret node entry points being never stored on any non-volatile storage device.

A tree, which is associated with hierarchical data, is understood to be an abstract tree which contains identification values as child nodes and, in general, offers a possibility to store data, for example in tables, so that the hierarchy of the data can be derived and methoded at any time.

Currently, two of the known variants can be used for this problem to store data in a database (or a key value store).

Variant 2 (FIG. 3: Array-of-Pointers Model):

There is a column containing values that uniquely identify a node, and another column that contains a list (or an array) of all unique node values that identify this node's child nodes. This list is usually a binary sequence array of either fixed or variable length. Without this list of child nodes, it is not possible to reconstruct any specific tree. Encrypting this list ensures that only people who know this key and one node of the tree can reconstruct the tree starting from this point without gaining any further information.

This model is disadvantageous when compared to the present invention, as the node values have to be stored in a list (storage space), especially if there are blocks for the child node list with fixed lengths (great lengths must be selected, as the maximum number of child nodes for a particular node is not known)

always have to be written and, depending on the concatenation method—especially when deleting an entry from the list, have to be partially or completely re-encrypted (BSP. AES-CBC, AES-GCM)

in case of variable block sizes for the children node list, metadata about the number of child nodes is available and, in this case, the frequent expansion of a block (e.g. many child nodes) results in a high fragmentation on the storage device a respective part of a tree and its child nodes are destroyed when a child node list is corrupted the tree cannot be used for key generation, and so either a master key is to be used for all entries from the root onwards (with all known disadvantages of master keys) or a key for decrypting the next child node list is encrypted and stored together with each child node list. This has the disadvantage that more storage space for each block is required and it opens up the possibility that these keys may be read or corrupted by unauthorized persons that the encrypted child node blocks always have to be available to the user, i.e. they must be loaded by the user or transferred to the user.

Variant 9 (FIG. 10) itself gives away a lot of information, even if the depth of the nodes is encrypted—because for each entry there is the information that it is either a sibling, child or parent node for the next level.

In an expansion, the encrypted value of the depth could serve as the entry point of a tree, but this, in turn, would only allow entry to the root node, or with a very disadvantageous adaptation, any level could theoretically be used as an entry node. In any case, an entire tree remains recognizable as such.

Moreover, this variant is very disadvantageous in practice as soon as nodes have to be inserted into the tree, which explains its extremely rare use. Due to this practical unusability for the application mentioned in the present document, the other disadvantages compared to the present invention will not be discussed.

Variant 1 (FIG. 2) can use any value for its child nodes, but simply encrypting the values in the parent column with the same key also provides information about the tree structure. Furthermore, it is possible to navigate through the entire tree if the key is known.

Due to their design, variants 3, 4, 5 and 8 (FIGS. 4, 5, 6 and 9) do not allow for a free choice of child node values in the sense of random numbers. If the node values are encrypted, even with a different key for each tree, a complete decryption of all rows in the table is required, choosing only those rows that are recognized as "validly decrypted". The decrypted data is, however, not indexed, which would again lead to a high performance loss and a lot of computing effort on the client side. Finally, it is not the goal of cryptographic systems to give one user the complete data of all users, even if it would not be due to the amount of data.

Variants 6 and 7 (FIGS. 7 and 8) are also not suitable for the present requirement, although their child nodes are freely selectable values. Decrypting the root does not reveal any information about the tree, which would also make a complete download and decryption of all data necessary. Furthermore, the disadvantages of variant 2 would also come into play in this case.

The method according to claim 1 was designed specifically to fulfil this requirement—without showing any significant disadvantages:

The method is applied recursively and requires only the transfer of the assigned information to a child node, but no further keys or lists of child nodes or the like.

The method does not require the use of slow asymmetric encryption methods at any stage; in addition, the keys in such encryption methods are long and cannot be chosen freely and therefore cannot be calculated at runtime.

The method allows for generating any number of symmetric keys, which means that these keys never have to be stored and never have to be transmitted from a storage device.

The child nodes stored according to the method do not—due to the purely calculated intermediate step via the secret node entry points—have any relation to one another.

The method generates secret node entry points which are volatile, i.e., they are never stored on a non-volatile storage unit. Preferably, these secret node entry points are kept in the client's memory at runtime. The same applies to the symmetric child node keys and data editing authorization base values. The client is free to store these values locally in an encrypted file for performance reasons, but if new generation hashing and encryption algorithms are used, their computational overhead is marginal in proportion to reading the data from the non-volatile storage device. This means that no secret information is stored on the client side or elsewhere and therefore cannot be read out by third parties.

The tree of the invention also allows for calculating symmetric keys for each child node, which makes it very convenient to pass on only a part from any child node downwards only by passing on the secret node entry point. This would not be possible when using a master key, because this master key would have to be passed on as well.

One possible approach is to apply one of the fast 128-bit hash functions such as XXHash, MurmurHash, HighwayHash, etc. to the secret node entry point generated from the child node to be decrypted. Preferably, a variable or constant character string can be appended, although this does not necessarily increase the method's security, Appending a descriptive character string (e.g., "key") improves the code's clarity and allows for hashing the secret node entry point with another descriptive character string as well and using this output for other functions.

It is not absolutely necessary to use a cryptographic function for this purpose, since only their high entropy is important for the generated keys (mainly guaranteed by bit independence), while their collision resistance is not.

If a cryptographic hash function is applied, the secred node entry point can under no circumstances be calculated based on the child node key, and it is certain that the key's entropy will not be reduced.

This expansion enables a user to pass on a single child node and the associated node key and to be sure that neither further child nodes can be inferred from this information nor any other child node can be decrypted with it.

Since it may be the case that there are no users and thus no need for authorization in the method of the invention, a possibility is now shown for guaranteeing write protection when secret node entry points are passed on:

Write protection is achieved by assigning, in addition to the data assigned to it, a freely selectable, but sufficiently long data editing authorization value to each child node and by the non-volatile storage device applying a preferably cryptographic hash function to at least the associated data editing authorization value before storing the child node, the result of said hash function being the data editing authorization value hash, and, if that child node is not already located on the non-volatile storage device, by storing at least the child node, its associated data and its data editing authorization value hash on the storage device, and, if this child node is already located on the non-volatile storage device, by overwriting the data associated with the child node only if the data editing authorization value hash provided together with the node matches the data editing authorization value hash stored on the storage device.

Since cryptographic hash values are used to identify child nodes, it is impossible that a child node is generated by two different trees (collision resistance) as well as that a specific child node is guessed (due to the possibility space of $2^{224}$ bit and more). Thus, the person who first stores a child node on the non-volatile storage device can be assumed to be the owner of the child node. The owner can use a value which is, for example, generated as a hash value from the child node and a secret value which only s/he knows. However, any other function with any other parameters can be used, since this makes no difference for the underlying write-protect function. It makes sense, however, that it is a value that can be calculated by the owner, as this value then does not have to be stored anywhere and therefore cannot be stolen.

This ensures that only the owner of a child node or those persons who also know the data editing authorization value can change data assigned to a child node.

As a preferably cryptographic hash function is applied to the data editing authorization value, it is ensured that a person who gains access to the data editing authorization value hash stored on the untrustworthy storage device does not know the actual data editing authorization value and thus cannot make any changes to the data.

In one specific embodiment, this data editing authorization value hash can only be changed if the owner has a secret data editing authorization base value based on which s/he can obtain the data editing authorization value using a cryptographic hash function. The non-volatile storage device changes the data editing authorization value hash only if, when compared, the cryptographic hash value of the data editing authorization base value is equal to the data editing authorization value hash.

This embodiment allows an owner to pass on a data editing authorization value to third parties so that they can make changes. This embodiment, however, also allows the owner to revoke write access, since only s/he knows the data editing authorization base value, and only if this value is known, it is possible to overwrite the data editing authorization value hash on the non-volatile storage device.

Adding constant values (salt) to these values is possible, but does not increase the system's safety. Nevertheless, for reasons of clarity, it may be useful to include a descriptive text (e.g., "data editing authorization value") as salt.

In a preferred embodiment, the data editing authorization base value is calculated for each child node. In this case, the owner of a tree can generate a secret, e.g., based on the first secret node entry secret, or obtain this secret in another way. This secret is valid for the whole tree, and, for each child node, a cryptographic hash function is applied to the secret and the child node. The result of this cryptographic hash function is then used as the data editing authorization base value for the respective child node. This is possible, using salt or adding secret values (such as the secret node entry point) to the hash is possible, but only increases security to a limited extent.

To ensure the integrity and authenticity of the data assigned to child nodes, it makes sense to apply an HMAC to all associated values, i.e. the child node itself and its assigned data, using the child node key as secret.

If the method according to the invention is used, for example, to store a directory and file structure, it is necessary to assign the information whether it is a file or a directory to every child node. There may also be comments or a chat history for files or their modification history. This is an example for a case in which it is necessary to provide a node with one or more attributes.

According to the invention, this is preferably solved by a child node group set whose elements are character strings of arbitrary length. In the case of a file system, the elements may, for example, be "file", "directory", "comment", "chat entry".

A variant includes a respective element of the child node group set in the node entry point generation step; in this case, including the same or a different element in the child node generation step would not have any additional benefits. In this variant, a plurality of secret node entry points is created for each child node, which may be necessary depending on the respective application.

Thus, in the case of a file in a directory (in the case of a child node for a parent node), the cryptographic hash function is applied to the following input to obtain the corresponding child node, whereby the order of the parameters does not play a significant role, especially with the cryptographic functions used today:
Cryptographic hash function(secret node entry point+child node numbering element+"file")
The same applies to directories and comments and other groups:
Cryptographic hash function(secret node entry point+child node numbering element+"directory")
Cryptographic hash function(secret node entry point+child node numbering element+"comment")

Thus, the method of the invention allows for child nodes to be assigned to any group without any metadata and without any loss of performance. This is guaranteed by the fact that the output of a cryptographic hash function can never be distinguished from a random number and always has the same output length. Since cryptographic hash functions do not provide the same output for any input, any value can be added to any child node group set.

The purpose of the invention is, among other things, a secure, metadata-free storage of data on an untrustworthy storage device. Since the non-volatile storage device does not have any information on the number of subordinate child nodes stored on the non-volatile storage device for each child node, the user must inquire about the existence of individual child nodes and can deduce from the response whether there are further child nodes or not.

This can be achieved by the user calculating a plurality of child nodes using the method and searching a certain number of them on the non-volatile storage device. Alternatively, the number of child nodes for a superordinate child node may also be stored as part of the data and encrypted therewith; this is, however, disadvantageous, since the data of the superordinate child node have to be adjusted when a child node is added. If one assumes that the number of child nodes is high and only wants to know this number, it is also possible to query child nodes in intervals and, as soon as an interval range is found, to search for smaller intervals within it.

For example, the child nodes 1000, 2000, 3000 to 50,000, etc. can be queried, and if the child node 30,000 is found, but the child node 31,000 is not found, it is clear that there are at least 30,000, but not more than 30,999 child nodes, and the values 30,001, 30,100, 30,200, 30,300, etc. can then be queried in intervals of 100 until the actual number of child nodes has been determined.

The data is preferably stored in a key value database, using a high-performance, non-cryptographic hash function. This step is not necessary, since the method of the invention already uses collision-free random numbers (from the perspective of the storage device).

Therefore, it is an equally good solution to store the data in the table of a database. In this case, the child node is defined as primary key in a column. A fragmentation of the index takes place very slowly, since the child nodes supplied are random numbers, and thus the index tree remains very well balanced. Due to the well-balanced child node values, searching for certain child nodes via an index is also faster than with ascending numbers that have a very low entropy.

For the level node numbering set, it is perfectly sufficient to allow a loop for a variable starting at a predefined, non-secret value to run to the number of desired child nodes, the variable being incremented by one each time.

In this case, security is already provided by the secret node entry point, so it does not provide greater security if the values of the level node numbering set are only known to the owner and persons selected by him/her. Adding a changing value for each child node to be created only serves the purpose of generating a new node value for each child node; even if only one bit is changed (which is the case every second time when incrementing a number, e.g. from 00000010 to 00000011), this value generates a random value which is completely different from the previously generated random values. This is verifiably guaranteed by the use of cryptographic hash functions, so there is no reason to apply a complex or secret function for creating the level node numbering set.

If cryptographic hash functions are used in the claims or in the specification, this refers to secure hash functions that are commonly used these days. These are mostly SHA2, SHA3 or Blake2, although other secure hash functions may also be used. Collision resistance is required, however, since all child nodes of all trees are stored in the same table or key value file.

It should also be noted that the method according to claim 1 can also use a symmetric encryption method as cryptographic hash. This has already been known according to the prior art (cf. Merkle-Damgård construction); in this specific case, the secrete node entry point would be used as a key. In this case, however, it should be noted that both the input length and the output length of symmetric encryption methods are fixed and, at 128 bit, no longer meet today's security standards. An encryption to 2×128 bit results in a significant slowdown compared to purely cryptographic hash functions, without offering any advantages in return.

For encryption, AES-256 is preferred, although the tested key lengths of 128 bit and 196 are absolutely sufficient in security respects and are up to 40% faster, if their performance is considered (due to their lower number of cycles).

It is, of course, possible to use other symmetric encryption algorithms.

The security of the present invention is based primarily on the use of HMACs (keyed-hash message authentication codes), the key at the root being a key known to the user and a calculated value for all further child nodes. The message is either a value that is predefined for every child node (e.g., a numbering of the child nodes) or a child node value. In both cases, the message may be complemented with further information; this does not increase security, however.

In the cases in which HMAC is usually used, two parties agree on a common secret (this common secret is often generated from a session key). This secret is used to authenticate messages and guarantee theft consistency.

The difference between the present invention and the sole use of HMACs consists in the specifically defined secrets and messages which allows for a tree to be calculated by recursive execution according to claim 1. In particular, this tree consists of "divided" edges, which means that a parent node cannot be assigned to its children without knowing the parent node secret.

It is underlined that HMACs are currently only used for authentication and integrity check purposes by hashing the data to be checked with a secret that is known to all authorized persons. If a calculated value is equal to the value accompanying the message, the message can be regarded as authentic.

It is in no way obvious for those skilled in the art to use HMACs for the construction of trees, in particular not according to a method according to claim 1, which implies more than just the use of HMACs.

Since Merkle trees are defined as cryptographic trees, there is also a clear dissociation of these, although there is no application in which data cannot be assigned to these trees.

Merkle trees are based on files of any size that are divided into same-size blocks. The aim of the Merkle tree consists in guaranteeing the integrity and consistency of data in distributed systems, for example. To achieve this, a directed tree is built recursively using hash values, in the direction of several leaves towards the root.

In the case of Merkle trees and their expansions and common applications, it is neither possible nor required to calculate nodes starting from the root into the depth.

Even if an expanded Merkle tree is used as a basis (new cryptographic hashing algorithms have any number of child nodes, for example, that are hashed to one parent node each, the nodes are numbered, a secret could be added to the nodes . . . ), the Merkle tree serves the purpose of compressing data, while the tree of the invention serves the purpose of expansion.

This means that the purpose runs counter to that of the present invention and, thus, does not anticipate its basic principles. The tree constructed based on the present invention can be expanded infinitely in depth and width, which is not possible with the Merkle tree. Furthermore, the tree, as described in the present invention, is constructed using only one secret, which is by definition not possible with the Merkle tree.

As an example, two identical trees with two different secret node entry points are generated according to the method of the invention, and their storage in a sorted list is shown. For clarity purposes, the tree from FIG. 1 is constructed. Specifically, a secret root node entry point can be a key generated according to PKCS #5 based on the combination of a user name and a password.

For simplicity purposes, 144 bit of SHA-256 are used as cryptographic hash function and HMAC and the values are written in Base64 format. The child nodes are incremented by 1 starting from 0. AES-128 is used for encryption. Many functions use SALT for illustration purposes, the difference between the use of one particular SALT and the use of another SALT consisting only in different output values. The assigned data in the example consist in the constant character string "TEST DATA".

A change of the order of the parameters in the cryptographic hash functions results in a completely changed output value, which is, however, not significant for the present method.

Exemplary Generation of the Identification Values of the Child Nodes

CALCULATED ONLY, never stored
        HMAC(gKEpROOT, salt1)=KID0 KID0
    HMAC (gKEpROOT, KID0)=gKEp0
        HMAC(gKEp0, salt1)=KID0.1 KID0.1
        HMAC(gKEp0, salt2)=KID0.2 KID0.2
        HMAC(gKEp0, salt3)=KID0.3 KID0.3
    HMAC (gKEp0, KID0.1)=gKEp0.1
        HMAC(gKEp0.1, salt1)=KID0.1.1 KID0.1.1
        HMAC(gKEp0.1, salt2)=KID0.1.2 KID0.1.2
    HMAC (gKEp0, KID0.2)=gKEp0.2
        HMAC(gKEp0.2, salt1)=KID0.2.1 KID0.2.1
        HMAC(gKEp0.2, salt2)=KID0.2.2 KID0.2.2
        HMAC(gKEp0.3, salt3)=KID0.2.3 KID0.2.3
    HMAC (gKEp0.2, KID0.2.2)=gKEp0.2.2
        HMAC(gKEp02.2, salt1)=KID0.2.2.1 KID0.2.2.1
gKEp: secret node entry point
KID: node ID
HMAC: hash-based message authentication code
salt: arbitrary character sequence Example using specific values—twice the tree from FIG. 1, using two different access data (Tree1, Tree2) and thus two different secret root node entry points.

| Step | Function applied | Result | SALT/VALUE |
|---|---|---|---|
| Secret node entry point of the tree | SHA256(TREE1) | yvkgxKWcNiFa9hvdFKN442wx | TREE1 |
| Data editing authorization base secret | SHA256(SHA256(TREE1)~EDIT) | t0Ih1k9P9gKiCAw6IVN3VM+Q | ~EDIT |
| Node 0 | SHA256(secret node entry point of the tree ~group1-child0) | 880MHNs0XtCDHJoMiLIkOCLY | ~group1-child0 |
| Secret node entry point node 0 | SHA256(secret node entry point of the tree ~node 0) | T/aw5FX37SGLoW3Fc1BmW7Pg | ~ |
| AES key node 0 | SHA256(secret node entry point node 0~AES_KEY) | dXfZGrL6s3Lh9jx8fcdGoTSz | ~AES_KEY |
| Assigned data node 0 | AES128(TEST DATA , AES key node 0) | MTvEJ+AWTa/TxzRsB1hfWg== | TEST DATA |
| Authentication node 0 | HMAC(AES key node 0, node 0~Assigned data node 0) | I1qa59zm2danQX21lsGjF6oa | ~ |
| Data editing authorization base value node 0 | SHA256(data editing authorization base secret~node 0) | zExfuj8rbJ+aWXEZlrAw/EVb | ~ |
| Data editing authorization value node 0 | SHA256(data editing authorization base value node 0) | Fn+hMn79m1vsSeIScE+jkJNG | |
| Data editing authorization value hash node 0 | SHA256(data editing authorization value node 0) | h/F6m/LunRAxVUITryXt6KWS | |

-continued

| Step | Function applied | Result | SALT/VALUE |
|---|---|---|---|
| Node 10 | SHA256(secret node entry point node 0~group1-child0) | YA1c7U6ByZFuMlQchMc0YE7G | ~group1-child0 |
| Secret node entry point node 10 | SHA256 (secret node entry point node 0~node10) | vXeJwHWLzYdvSj+ejFK/NuA3 | ~ |
| AES key node 10 | SHA256(secret node entry point node 10~AES_KEY) | FtT8WxucgxO19X9youmc4DdC | ~AES_KEY |
| Assigned data node 10 | AES128(TEST DATA, AES key node 10) | CDi4cB1ZnMrXT7Rwsn74eA== | TEST DATA |
| Authentication node 10 | HMAC(AES key node 10, node 10~assigned data node 10) | SC5h5zWY64Ms1rtAtg8Gh2Rm | ~ |
| Data editing authorization base value node 10 | SHA256(data editing authorization base secret~node 10) | ZHOg0U8GU8iiC5i5zTQbzU7l | ~ |
| Data editing authorization value node 10 | SHA256(data editing authorization base value node 10) | zlW1/1FeNt6QE2KUxyzWDOtL | |
| Data editing authorization value hash node 10 | SHA256(data editing authorization value node 10) | 1QJF3e3Akfi6cDqTiHKusVgY | |
| Node 110 | SHA256(secret node entry point node 10~group1-child0) | WLV/Q4vtxDpP7NOi5B4mVBDl | ~group1-child0 |
| Secret node entry point node 110 | SHA256 (secret node entry point node 10~node 110) | d3Ia5lJBcaaGPHpcvJrzEdpV | ~ |
| AES key node 110 | SHA256(secret node entry point node 110~AES_KEY) | ATLDpyVF1tbcW8NzyE8mxZa+ | ~AES_KEY |
| Assigned data node 110 | AES128(TEST DATA, AES key node 110) | fdDDmA441e25Bmg40YX9R9w== | TEST DATA |
| Authentication node 110 | HMAC(AES key node 110, node 110~assigned data node 110) | jGeDwFRjUBNxjoxgs3Q2d/ly | ~ |
| Data editing authorization base value node 110 | SHA256(data editing authorization base secret~node 110) | jGaLVWO2HE+TMnWZFaf4Gxz9 | ~ |
| Data editing authorization value node 110 | SHA256(data editing authorization base value node 110) | rQSi9YebhnGEAIouMQVXEcSb | |
| Data editing authorization value hash node 110 | SHA256(data editing authorization value node 110) | v8Ta5IuidgdhV2tZSfMxuvFr | |
| Node 120 | SHA256(secret node entry point node 10~group1-child1node 120) | h0zrBvibp5lIg+XTz3W0p/VV | ~group1-child1 |
| Secret node entry point node 120 | SHA256 (secret node entry point node 10~node 120) | TTUMd/cqRW4r2KTXj0QL5Sqm | ~ |
| AES key node 120 | SHA256(secret node entry point node 120~AES_KEY) | oqtzhj8/zxAXwtPurPJ2UAlz | ~AES_KEY |
| Assigned data node 120 | AES128(TEST DATA, AES key node 120) | mMXvDN9wglGEMDzUExoXmg== | TEST DATA |
| Authentication node 120 | HMAC(AES key node 120, node 120~assigned data node 120) | LiB4mXrHQ1mHedt6V46y12mg | ~ |
| Data editing authorization base value node 120 | SHA256(data editing authorization base secret~node 120) | JkVbi5HqFxkGYJPqh5nfBSkd | ~ |
| Data editing authorization value node 120 | SHA256(data editing authorization base value node 120) | wfihuO/MchcaMl5i3ZdXVTzg | |
| Data editing authorization value hash node 120 | SHA256(data editing authorization value node 120) | ZlayfyV71Dg4PeKM12F1lZwW | |
| Node 20 | SHA256(secret node entry point node 0~group1-child1) | BLQXcSHIRHKg21uWhvLwV/RP | ~group1-child1 |
| Secret node entry point node 20 | SHA256 (secret node entry point node 0~node 20) | WbVj+i4XEdrlQCz1DbdaiGZV | ~ |
| AES key node 20 | SHA256(secret node entry point node 20~AES_KEY) | 1wKZ8OCxcT9nkWu/6p4YrZBo | ~AES_KEY |
| Assigned data node 20 | AES128(TEST DATA, AES key node 20) | 0hxIDZ/qDRxrk8vL+g/rZQ== | TEST DATA |
| Authentication node 20 | HMAC(AES key node 20, node 20~assigned data node 20) | NvZ9IyexSePN95E4FE/r2V0P | ~ |
| Data editing authorization base value node 20 | SHA256(data editing authorization base secret~node 20) | JaqzT2/diw0pV47gGIRnG Zur | ~ |
| Data editing authorization value node 20 | SHA256(data editing authorization base value node 20) | faRgDx8wcwpMr+n19by2TYH5 | |
| Data editing authorization value hash node 20 | SHA256(data editing authorization value node 20) | 1NSfugXrUQVb+iYXoDvG16Ol | |
| Node 120 | SHA256(secret node entry point node 20~group1-child0) | 59REPHrkLhOOt/B+b8fqPafY | ~group1-child0 |
| Secret node entry point node 120 | SHA256(secret node entry point node 20~node 120) | 7hfwX0u64LWxEgEhuGA349/Q | ~ |
| AES key node 120 | SHA256(secret node entry point node 20~AES_KEY) | 3hz8p+gPh9sm6e0m3vNIoGVj | ~AES_KEY |
| Assigned data node 120 | AES128(TEST DATA , AES key node 120) | NZgjz65Kv5AmcDCdj5V/mw== | TEST DATA |
| Authentication node 120 | HMAC(AES key node 120, node 120~assigned data node 120) | wcnw8KtH76Lpb8Cz1qR7svfQ | ~ |
| Data editing authorization base value node 120 | SHA256(data editing authorization base secret~node 120) | jeF8K8rpBtfRleyx3wIXkRVb | ~ |
| Data editing authorization value node 120 | SHA256(data editing authorization base value node 120) | W9dTMbbUsnmORZYxRDGg1UTy | |
| Data editing authorization value hash node 120 | SHA256(data editing authorization value node 120) | uFuTv4RxnZWKuXS4dctkP5aq | |
| Node 220 | SHA256(secret node entry point node 20~group1-child1) | M3yDOcMJXfCAyUyGnFZn/JhD | ~group1-child1 |
| Secret node entry point node 220 | SHA256(secret node entry point node 20~node 220) | Juyt8fRPz+gDTQLI10Ge9OOe | ~ |
| AES key node 220 | SHA256(secret node entry point node 120~AES_KEY) | D4N8DLKALEqiecAe5pgRPxNk | ~AES_KEY |
| Assigned data node 220 | AES128(TEST DATA, AES key node 220) | 2tY3PBHk0hPMipc9h5RfEQ== | TEST DATA |
| Authentication node 220 | HMAC(AES key node 220, node 220~assigned data node 220) | +eamzcStRQ4hbIwla22UfsIg | ~ |
| Data editing authorization base value node 220 | SHA256(data editing authorization base secret~node 220) | P9zND7/SS9IGRpHZtcZH4/Xb | ~ |
| Data editing authorization value node 220 | SHA256(data editing authorization base value node 220) | 0uzrhsnnzHdyOEJRCdkJG6OB | |
| Data editing authorization value hash node 220 | SHA256(data editing authorization value node 220) | idLYwip3nGJzdY6x2vAyYP0s | |
| Node 1220 | SHA256(secret node entry point node 220~group1-child0) | f8aUCIKifl/grnzi8/KX2gsV | ~group1-child0 |
| Secret node entry point node 1220 | SHA256(secret node entry point node 220~node 1220) | l6N1tZPyFQ/lifbhFdnmWZYD | ~ |
| AES key node 1220 | SHA256(secret node entry point node 1220~AES_KEY) | ki1wxZJ6Oh0Pb3r4BJsCIACP | ~AES_KEY |

-continued

| Step | Function applied | Result | SALT/VALUE |
|---|---|---|---|
| Assigned data node 1220 | AES128(TEST DATA, AES key node 1220) | MWhrw3M9gZfs8nmpLgtbgg== | TEST DATA |
| Authentication node 1220 | HMAC(AES key node 1220, node 1220~assigned data node 1220) | qjuqk8R4spU6uAn4cGSvEZy+ | ~ |
| Data editing authorization base value node 1220 | SHA256(data editing authorization base secret~node 1220) | +lZQayIkx9mkG0iKo72+wubX | ~ |
| Data editing authorization value node 1220 | SHA256(data editing authorization base value node 1220) | gDF9mHY30JAYE1rK1od3youD | ~ |
| Data editing authorization value hash node 1220 | SHA256(data editing authorization value node 1220) | zZCWhn8BnnrtaHSZjogzixEy | ~ |
| Node 320 | SHA256(secret node entry point node 20~group1-child0) | Nir/fLbvWOQqWE149ZioeDzy | ~group1-child0 |
| Secret node entry point node 320 | SHA256(secret node entry point node 20~node 320) | w812eLrr0vLi/gbP+xBDRAbt | ~ |
| AES key node 320 | SHA256(secret node entry point node 1220~AES_KEY) | UZMng9o1s9PrpscJWakqunqO | ~AES_KEY |
| Assigned data node 320 | AES128(TEST DATA, AES key node 320) | LAw8VKZIkN6/XfTkPPjjnQ== | TEST DATA |
| Authentication node 320 | HMAC(AES key node 320, node 320~assigned data node 320) | e3olwSYwhwPsGTRnhWtZ1Msj | ~ |
| Data editing authorization base value node 320 | SHA256(data editing authorization base secret~node 320) | aHnhBHY4Jql+lqxbi9exDWCb | ~ |
| Data editing authorization value node 320 | SHA256(data editing authorization base value node 320) | Rod5CQTkCcCoiergyR0xxR/C | ~ |
| Data editing authorization value hash node 320 | SHA256(data editing authorization value node 320) | EhZ8x6k3AOD+ZZLOhAZOF8GI | ~ |
| Node 30 | SHA256(secret node entry point node 0~group1-child2) | mH2ZYvu1T5ZdpjQQR84qOR7m | ~group1-child2 |
| Secret node entry point node 30 | SHA256 (secret node entry point node 0~node 30) | ObNZIjgRVBdkA+sthUigw/6n | ~ |
| AES key node 30 | SHA256(secret node entry point node 320~AES_KEY) | d+8l7bq/6XrtFo0cMCg9pXlW | ~AES_KEY |
| Assigned data node 30 | AES128(TEST DATA, AES key node 30) | 2zXSxReSrjX+pM1So8ptqg== | TEST DATA |
| Authentication node 30 | HMAC(AES key node 30, node 30~assigned data node 30) | egK/J3ydL8N0RgfST5/y+dAk | ~ |
| Data editing authorization base value node 30 | SHA256(data editing authorization base secret~node 30) | 4PvHHuuMHHBvbSVVl45R85dZ | ~ |
| Data editing authorization value node 30 | SHA256(Data Editing Authorization Base Value node 30) | +jDoipU/wFFWHNe1GRsXK20S | ~ |
| Data Editing Authorization Value Hash Node 30 | SHA256(data editing authorization value node 30) | Dc0POncKCQuwh8VBRzLKxbuf | ~ |

The bold characters are stored permanently as node identification values together with the encrypted data, the left column only serves as an explanation. It is shown that several trees are present in the same tree-spanning child node set.

Tree1.K120 59REPHrkLhOOt/B+b8fqPafY
Tree1.K10 75vHWovsJUPk582yzL8cRuIS
Tree1.K0 880MHNs0XtCDHJoMiLlkOCLY
Tree2.K20 93x7ONVNM/3qO4IterIF3zV6
Tree1.K20 BLQXcSHIRHKg21uWhvLwV/RP
Tree2.K30 f/qIcKUd8Plbwbmmxt FUuFyC
Tree1.K1220 f8aUClKifl/grnzi8/KX2gsV
Tree1.K210 hOzrBvibp51Ig+XTz3W0p/VV
Tree2.K1220 h4NKrDHXhrAS5yyihGYUCcCi
Tree2.K0 kZo2SEb5u/3IFMD1Z5aJGcLS
Tree2.K120 Lblpml5iuo7RBjWxzaBJxpOv
Tree1.K220 M3yDOcMJXfCAyUyGnFZn/JhD
Tree1.K30 mH2ZYvu1T5ZdpjQQR84qOR7m
Tree1.K320 Nir/fLbvWOQqWE149ZioeDzy
Tree2.K110 ufEnS/5e0FohEd9/jSmootyf
Tree2.K220 VCsH+WJ5wKa81H5OsXfgekwm
Tree2.K210 wJNVMuEqAG5MHqt4YMAvi6GP
Tree1.K110 WLV/Q4vtxDpP7NOi5B4mVBDI
Tree1.K10 YA1c7U6ByZFuMIQchMcOYE7G
Tree2.K320 ygFLp9cAd0V+E6iBPxmYGMZy

The invention claimed is:

1. A method for storing hierarchical data protected by access data in an untrustworthy environment, wherein unique identification values of child nodes of at least one associated tree are determined for the hierarchical data and are stored together with said hierarchical data, the method comprising:
   calculating a root node entry point based on the access data by means of a predeterminable calculation function in a volatile way, said root node entry point representing a secret node entry point from which an identification value of a root node of a tree is subsequently calculated, said root node representing one of the child nodes in the tree; and
   applying a child node generation step to generate the identification values of the child nodes based on one of the secret node entry points, in said step performing operations comprising:
   creating or using a child node numbering set, which contains at least as many different elements as the number of child nodes to be generated and reconstructed for a volatile secret node entry point;
   applying for the first and each further required child node, a cryptographic hash function to at least the volatile secret node entry point and an assigned value from the child node numbering set, the result of the applied cryptographic hash function representing the respective identification value of the child node;
   adding the identification values of the child nodes together with their associated, encrypted data to a tree-spanning set of child nodes on a non-volatile storage device in an untrustworthy environment; and
   expanding the child nodes of the tree recursively using hierarchically subordinate child nodes, by calculating secret node entry points for each of these child nodes in a node entry point generation step in a volatile manner by performing operations comprising:
   applying a cryptographic hash function to at least the secret node entry point from which the child node to be expanded using hierarchically subordinate child nodes was calculated, and to the identification value of the same child node;

subsequently recursively applying the child node generation step to the newly generated volatile secret node entry points, said secret node entry points being never stored on any non-volatile storage device assigning a selectable data editing authorization value to each child node in addition to the access data assigned to each child node;

applying, by the non-volatile storage device, a cryptographic hash function to at least the associated data editing authorization value before storing the child node, the result of said hash function being the data editing authorization value hash;

storing, if that child node is not already located on the non-volatile storage device, at least the child node, data associated with the child node and the data editing authorization value hash on the storage device; and overwriting, if the child node is already located on the non-volatile storage device, data associated with the child node only if the data editing authorization value hash provided together with the node matches the data editing authorization value hash stored on the non-volatile storage device.

2. The method according to claim 1, wherein, for determining the number of stored child nodes for a secret node entry point on the non-volatile storage device, the method further comprises:

creating a search child node list with a predefined number of child nodes;

searching the predefined number of child nodes on the non-volatile storage device;

creating, as long as the predefined number of child nodes is found on the non-volatile storage device, a further search child node list with this predefined number of child nodes by applying the child node generation step, said list continuing the previous search child node lists;

searching the child nodes on the non-volatile storage device;

increasing the number of child nodes by the predefined number; and in response to the predefined number of child nodes not being found on the non-volatile storage device, increasing the number of child nodes by the number of child nodes found on the non-volatile storage device, thereby defining an actual number.

3. The method according to claim 1, further comprising encrypting the hierarchical data assigned to child nodes using a symmetric method, wherein a different child node key is calculated for each child node by applying a secure function to at least the secret node entry point generated by applying the node entry point generation step to the respective child node, a binary output value of the secure function corresponding to a required key length.

4. The method according to claim 3, further comprising using a cryptographic hash function as said secure function, whereby knowing only one child node and the node key associated with the child node makes it possible to decrypt the encrypted data of the known child node without making it possible to access further child nodes or encrypted data.

5. The method according to claim 1, further comprising:
generating a cryptographic check value using at least the child node, data associated with the child node and the child node key using a Keyed Hash Massage Authentication Code (HMAC); and storing the cryptographic check value together with the child node to ensure the integrity and authenticity of the encrypted data associated with child nodes of the tree.

6. The method according to claim 1, further comprising using a key value database for storing the tree-spanning set of child nodes, the key value database comprising at least child nodes and data associated with the child nodes on the non-volatile storage device.

7. The method according to claim 1, further comprising using a table in a database for storing a tree-spanning set of child nodes, comprising at least child nodes and data associated with the child nodes, on the non-volatile storage device, said table comprising a unique index at least for the column in which the child nodes are stored.

8. The method according to claim 1, further comprising forming a level node numbering set using a function that defines a predefined number as a first element, every further element of the level node numbering increasing a previous number by a predefined count value.

9. The method according to claim 1, further comprising changing the data editing authorization value hash of a child node by the non-volatile storage device to a new data editing authorization value hash only if the child node is provided with a data editing authorization base value comprising a cryptographic hash corresponding to the data editing authorization value of the child node.

10. The method according to claim 1, further comprising:
creating a child node group set, elements of the child node group set being character strings of arbitrary length; and applying the cryptographic hash function to that element of the child node group set which corresponds to the child node group to which the child node is to be assigned.

* * * * *